(12) United States Patent
Baba

(10) Patent No.: US 8,232,662 B2
(45) Date of Patent: Jul. 31, 2012

(54) WIND TURBINE GENERATOR AND START-UP METHOD OF THE SAME

(75) Inventor: Mitsuya Baba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 43 days.

(21) Appl. No.: 12/681,261

(22) PCT Filed: Jan. 15, 2010

(86) PCT No.: PCT/JP2010/050435
§ 371 (c)(1),
(2), (4) Date: Aug. 13, 2010

(87) PCT Pub. No.: WO2011/086691
PCT Pub. Date: Jul. 21, 2011

(65) Prior Publication Data
US 2011/0266798 A1 Nov. 3, 2011

(51) Int. Cl.
*H02P 9/04* (2006.01)
(52) U.S. Cl. .......................... 290/44; 290/55
(58) Field of Classification Search .................. 290/44, 290/55; 416/1, 41
See application file for complete search history.

(56) References Cited

U.S. PATENT DOCUMENTS

| 4,160,170 | A | | 7/1979 | Harner et al. | |
|---|---|---|---|---|---|
| 4,189,648 | A | * | 2/1980 | Harner | 290/44 |
| 4,193,005 | A | * | 3/1980 | Kos et al. | 290/44 |

(Continued)

FOREIGN PATENT DOCUMENTS

JP 59-176473 10/1984

(Continued)

OTHER PUBLICATIONS

Australian Notice of Acceptance for 2010201355 dated Mar. 22, 2012.

*Primary Examiner* — Tho D Ta
(74) *Attorney, Agent, or Firm* — Lowe Hauptman Ham & Berner LLP

(57) ABSTRACT

A start-up method of a wind turbine generator includes a step of increasing a pitch angle of a wind turbine blade from a feather pitch angle to a fine pitch angle. The step of increasing the pitch angle of the wind turbine blade includes steps of: determining based on first to n-th pitch angles ($n \geq 2$) greater than the feather pitch angle and smaller than the fine pitch angle and first to n-th rotational speed conditions associated with the first to n-th pitch angles, respectively, whether a control target rotational speed, which is a wind turbine speed or generator speed, satisfies the i-th rotational speed condition when the pitch angle reaches the i-th rotational speed out of the first to n-th pitch angles, the first to n-th pitch angles and the first to n-th rotational speed conditions being stored in a storage unit; decreasing the pitch angle to the (i−1)-th pitch angle or the feather pitch angle in a case that the control target rotational speed does not satisfy the i-th rotational speed condition when the pitch angle reaches the i-th pitch angle; and increasing the pitch angle to the (i+1)-th pitch angle or the fine pitch angle in a case that the control target rotational speed satisfies the i-th rotational speed condition when the pitch angle reaches the i-th pitch angle.

4 Claims, 4 Drawing Sheets

U.S. PATENT DOCUMENTS

| | | | | |
|---|---|---|---|---|
| 4,435,647 | A | * | 3/1984 | Harner et al. .................... 290/44 |
| 7,780,412 | B2 | * | 8/2010 | Zang et al. ......................... 416/1 |
| 2008/0069692 | A1 | * | 3/2008 | Oohara et al. ................... 416/31 |
| 2011/0204630 | A1 | * | 8/2011 | Arinaga et al. ................. 290/44 |

FOREIGN PATENT DOCUMENTS

| | | |
|---|---|---|
| JP | 62-214275 | 9/1987 |
| JP | 5078190 | 10/1993 |
| JP | 06-210269 | 8/1994 |
| JP | 2005039924 A | 2/2005 |

* cited by examiner

WIND TURBINE GENERATOR AND START-UP METHOD OF THE SAME

RELATED APPLICATIONS

The present application is National Phase of International Application Number PCT/JP2010/050435 filed Jan. 15, 2010, the disclosure of which is hereby incorporated by reference herein in its entirety.

TECHNICAL FIELD

The present invention is related to a wind turbine generator, more particularly to optimization of the start-up procedure of a wind turbine generator.

BACKGROUND ART

One issue that should be considered to start a wind turbine generator is to avoid undesired influence on the utility grid (for example, to reduction in the voltage of the utility grid) when the wind turbine generator is interconnected to the utility grid to be brought online. As a technique for preventing undesired influence on the utility grid, there is known a technique using a soft starter, for example. Such a technique is disclosed in, for example, Japanese Unexamined Patent Publication JP 2005-39924 A.

One parameter that should be considered in starting the wind turbine generator is the generator speed (or the wind turbine speed). It is an effective approach for avoiding undesired influence on the utility grid to interconnect the wind turbine generator to the utility grid in a state in which the generator speed is controlled to an appropriate rotational speed (referred to as "interconnection speed").

It is necessary to set the pitch angle of the wind turbine blades to the fine pitch angle so as to raise the generator speed of the generator up to the interconnection speed. Here, a method is adopted in which the pitch angle is gradually increased from the feather pitch angle to the fine pitch angle, because of the necessity to gradually increase the wind turbine speed. One typical procedure is as follows: Referring to FIG. 5, the pitch angle is first set to a predetermined waiting pitch angle θwait. In this state, when the wind turbine speed is increased up to a predetermined rotational speed (waiting speed), the pitch angle is increased up to the fine pitch angle θfine at a predetermined pitch rate. Thereafter, the wind turbine generator is interconnected to the utility grid when the wind turbine speed reaches the interconnection speed. Although the wind turbine generator is interconnected to the utility grid after the pitch angle reaches the fine pitch angle θfine in the example shown in FIG. 5, the wind turbine speed may reach the interconnection speed before the pitch angle reaches the fine pitch angle θfine.

When a delay occurs to the follow-up of the rotational speed, however, such method may result in that the pitch angle is set to an excessive attack angle for the wind speed of the wind flowing into the wind turbine, causing stall of the wind turbine blades. A delay may occur to the follow-up of the rotational speed, for example, when the wind speed is reduced after the pitch angle starts being increased from the waiting speed or when the blades suffer from deterioration of the aerodynamic performance, weight increase or occurrence of unbalance, due to icing thereon. When the wind turbine blades are placed into the stall state, this disables the increase in the rotational speed, causing a start-up failure. In this case, it is required to start the start-up procedure over again, which disadvantageously causes a problem in the operation.

CITATION LIST

Patent Literature

Patent Document 1: JP 2005-39924 A

SUMMARY OF INVENTION

Therefore, an object of the present invention is to prevent a wind turbine blade from stalling in starting up a wind turbine generator and to thereby achieve a stable start-up of the wind turbine generator.

In an aspect of the present invention, a start-up method of a wind turbine generator includes a step of increasing a pitch angle of a wind turbine blade from a feather pitch angle to a fine pitch angle. The step of increasing the pitch angle of the wind turbine blade includes steps of:

determining based on first to n-th pitch angles (n≧2) greater than the feather pitch angle and smaller than the fine pitch angle and first to n-th rotational speed conditions associated with the first to n-th pitch angles, respectively, whether a control target rotational speed, which is a wind turbine speed or generator speed, satisfies the i-th rotational speed condition when the pitch angle reaches the i-th rotational speed out of the first to n-th pitch angles, the first to n-th pitch angles and the first to n-th rotational speed conditions being stored in a storage unit;

decreasing the pitch angle to the (i−1)-th pitch angle or the feather pitch angle in a case that the control target rotational speed does not satisfy the i-th rotational speed condition when the pitch angle reaches the i-th pitch angle; and increasing the pitch angle to the (i+1)-th pitch angle or the fine pitch angle in a case that the control target rotational speed satisfies the i-th rotational speed condition when the pitch angle reaches the i-th pitch angle.

In the above-described procedure of the start-up method of the wind turbine generator, the pitch angle is decreased when the wind turbine/generator speed is not sufficiently increased in the process of increasing the pitch angel of the wind turbine blade up to the fine pitch angle, and this prevents the wind turbine blade from stalling to achieve a stable start-up of the wind turbine generator.

In another aspect of the present invention, a wind turbine generator is provided with a wind turbine rotor including a wind turbine blade having a variable pitch angle; a generator coupled to the wind turbine rotor; and a controller for controlling the pitch angle. The controller includes a storage unit storing first to n-th pitch angles (n≧2) greater than a feather pitch angle and smaller than a fine pitch angle and first to n-th rotational speed conditions associated with the first to n-th pitch angles, respectively. The controller controls the pitch angle of the wind turbine blade to be increased from the feather pitch angle to the fine pitch angle. In the control for increasing the pitch angle from the feather pitch angle to the fine pitch angle, the controller determines whether a control target rotational speed, which is a wind turbine speed or a generator speed, satisfies the i-th rotational speed condition when the pitch angle reaches the i-th pitch angle out of the first to n-th pitch angle. The controller decreases the pitch angle to the (i−1)-th pitch angle or the feather pitch angle if the control target rotational speed does not satisfy the i-th rotational speed condition when the pitch angle reaches the i-th pitch angle, and increases the pitch angle to the (i+1)-th pitch angle or the fine pitch angle if the control target rotational speed satisfies the i-th rotational speed condition when the pitch angle reaches the i-th pitch angle.

In the wind turbine generator thus constructed, the pitch angle is decreased when the wind turbine/generator speed is not sufficiently increased in the process of increasing the pitch angle of the wind turbine blade up to the fine pitch angle, and this prevents the wind turbine blade from stalling to achieve a stable start-up of the wind turbine generator.

The present invention prevents the wind turbine blade from stalling in starting up the wind turbine generator, and thereby achieves a stable start-up of the wind turbine generator.

DESCRIPTION OF EMBODIMENTS

Figure 1:
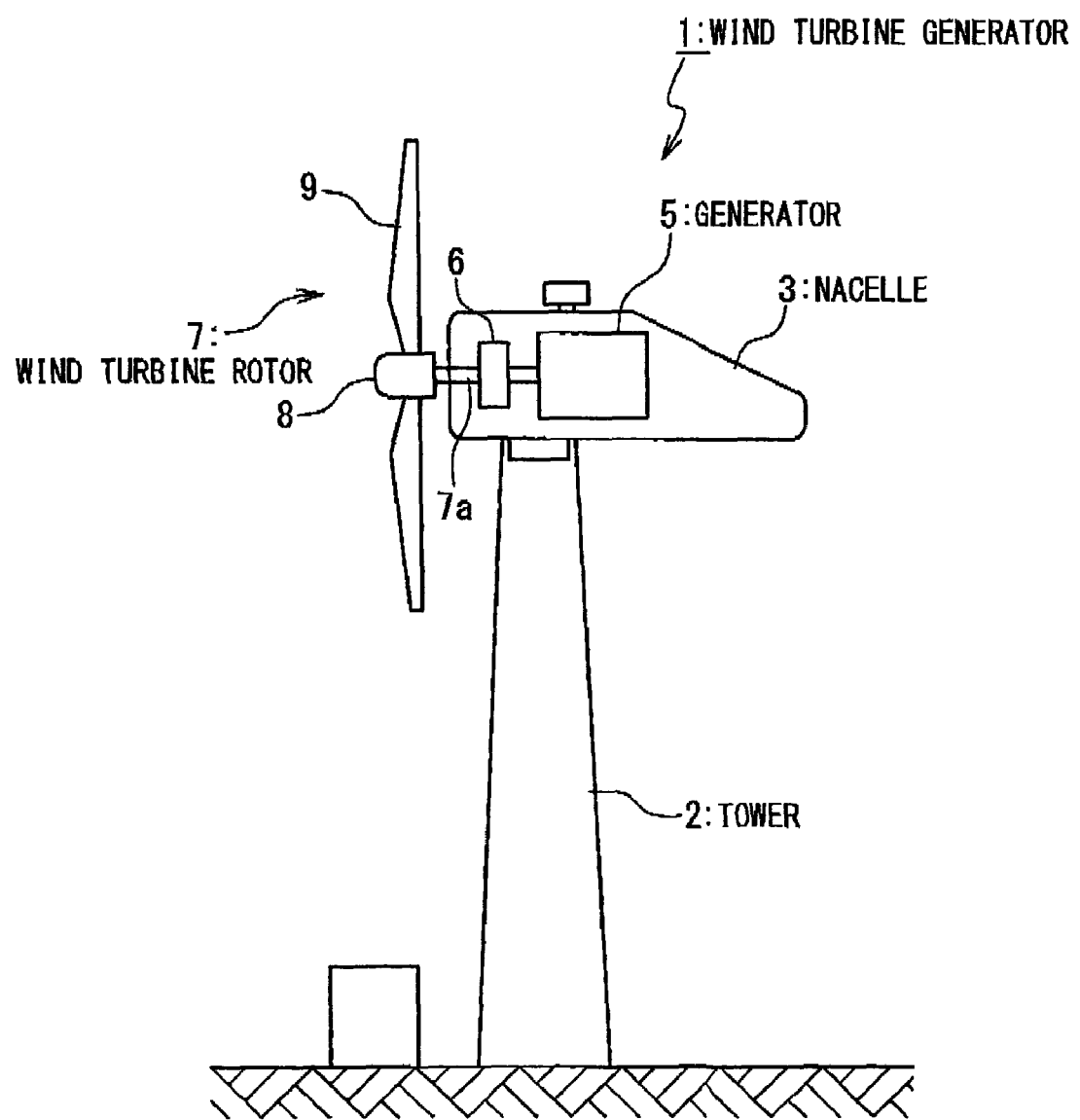
FIG. 1 is a side view showing the configuration of a wind turbine generator in one embodiment of the present invention.

FIG. 1 is a side view showing the configuration of a wind turbine generator 1 in one embodiment of the present invention. The wind turbine generator 1 of this embodiment of the present invention is provided with a tower 2 and a nacelle 3 provided on the top of the tower 2. Mounted in the nacelle 3 are a generator 5 and a gear box 6. The rotor shaft of the generator 5 is mechanically connected to a shaft 7a of a wind turbine rotor 7. The wind turbine rotor 7 includes a hub 8 connected to the shaft 7a and wind turbine blades 9 attached to the hub 8. The pitch angle θ of the wind turbine blades 9 can be varied with pitch drive mechanisms 11 (not shown).

Figures 2, 3:
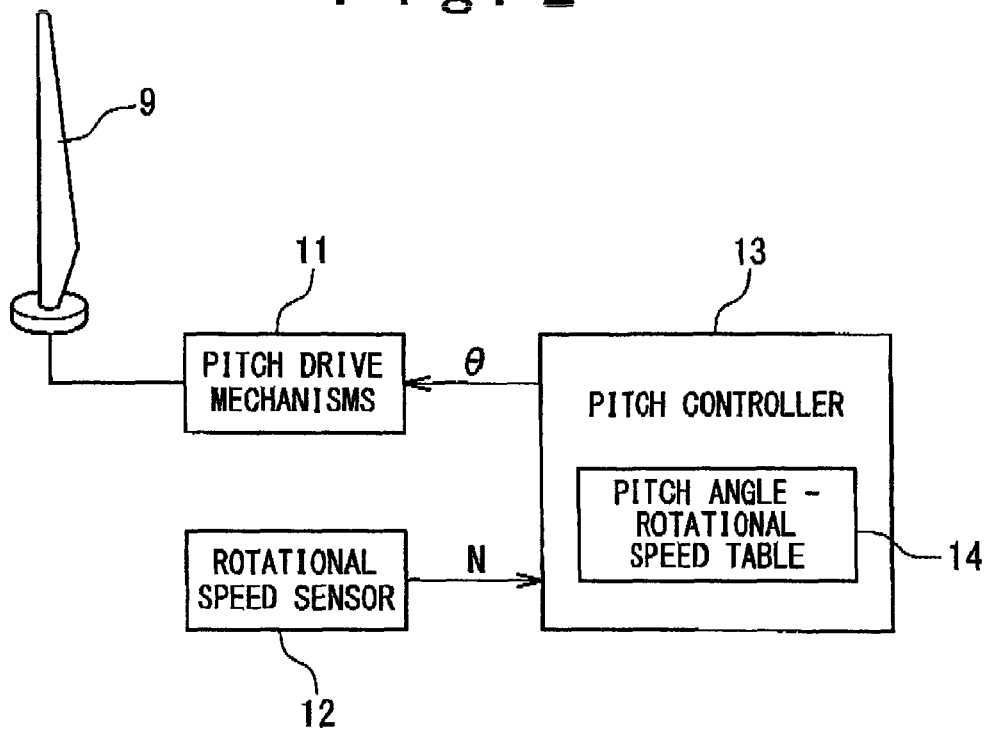
FIG. 2 is a block diagram showing an example of the configuration of a control system of the wind turbine generator in one embodiment of the present invention.
FIG. 3 is a block diagram showing an example of contents of a pitch angle-to-rotational speed table in one embodiment of the present invention.

FIG. 2 is a block diagram showing an example of the configuration of a control system of the wind turbine generator 1 in this embodiment. In this embodiment, the control system of the wind turbine generator 1 includes pitch drive mechanisms 11, a rotational speed sensor 12, and a pitch controller 13. The pitch drive mechanisms 11 control the pitch angle θ of the wind turbine blades 9 in response to the control of the pitch controller 13. Although FIG. 2 shows only one wind turbine blade 9 and one pitch drive mechanism 11, the wind turbine rotor 7 actually includes a plurality of wind turbine blades 9 (typically, three) and the pitch drive mechanisms 11 are provided for the respective wind turbine blades 9. The rotational speed sensor 12 is provided near the rotor of the generator 5 to measures the generator speed N (that is, the rotational speed of the rotor of the generator 5). The pitch controller 13 operates the pitch drive mechanisms 11 in response to the generator speed N obtained by the rotational speed sensor 12, thereby controlling the pitch angle of the wind turbine blades 9. Although FIG. 2 only shows elements related to the start-up procedure of the wind turbine generator 1 to be executed in this embodiment, it would be obvious to the person skilled in the art that various devices other than those shown in FIG. 2 are related to control over the wind turbine generator 1.

The pitch controller 13 contains a pitch angle-rotational speed table 14. FIG. 3 is a block diagram showing an example of the contents of the pitch angle-to-rotational speed table 14. Described in the pitch angle-to-rotational speed table 14 are judgment pitch angles θ1 to θ5 and the judgment generator speeds N1 to N5 associated with the judgment pitch angles θ1 to θ5, respectively, in this embodiment. Here, the judgment pitch angles θ1 to θ5 are each the pitch angle θ of the wind turbine blades 9 for which the generator speed N is judged, and, the judgment generator speed Ni is the minimum allowable generator speed N when the pitch angle θ of the wind turbine blades 9 reaches the associated judgment pitch angle θi. Furthermore, the fine pitch angle θfine and the value of the interconnection speed Nin are described in the pitch angle-rotational speed table 14. Here, the judgment pitch angles θ1 to θ5 and the judgment generator speeds N1 to N5 satisfy the following relation:

$$\theta fth < \theta 1 < \theta 2 < \theta 3 < \theta 4 < \theta 5 < \theta fine, \text{ and}$$
$$N1 < N2 < N3 < N4 < N5 < Nin,$$

where θth is the feather pitch angle. The judgment pitch angles θ1 to θ5 and the judgment generator speeds N1 to N5 described in the pitch angle-rotational speed table 14 are used in the start-up procedure of the wind turbine generator 1, which is described later. Once the pitch angle-rotational speed table 14 is stored in a storage unit of the pitch controller 13, the stored pitch angle-rotational speed table 14 may be commonly used for every start-up of the wind turbine generator 1. Alternatively, the pitch angle-rotational speed table 14 may be given to the pitch controller 13 every when the wind turbine generator 1 is started up.

In the following, a description is given of the start-up procedure of the wind turbine generator 1 in this embodiment.

First, an outline of the start-up procedure of the wind turbine generator 1 in this embodiment is given. In this embodiment, the pitch angle θ of the wind turbine blades 9 is increased step by step from the feather pitch angle θfth to the fine pitch angle θfine. The generator speed N is monitored at every step of increasing the pitch angle θ of the wind turbine blades 9. If the generator speed N does not satisfy the generator speed requirement defined with the generator speed Ni (in this embodiment, a requirement that the generator speed N exceeds the judgment generator speed Ni), when the pitch angle θ of the wind turbine blades 9 reaches the judgment pitch angle θI, the pitch angle θ of the wind turbine blades 9 is decreased to the judgment pitch angle at the previous step (the judgment pitch angle θ(i−1)) or the feather pitch angle θfth. Here, the pitch angle θ of the wind turbine blades 9 is returned to the feather pitch angle θfth to quit the start-up of the wind turbine generator 1, if the generator speed N is smaller than the judgment generator speed N1 when the pitch angle θ of the wind turbine blades 9 reaches the judgment pitch angle θ1. On the other hand, if the generator speed N reaches the judgment generator speed Ni when the pitch angle θ of the wind turbine blades 9 reaches the judgment pitch angle θi, the pitch angle θ of the wind turbine blades 9 is increased to the next pitch angle θ(i+1) or to the fine pitch angle θfine. When the generator speed N reaches the interconnection speed Nin in a state in which the pitch angle θ of the wind turbine blades 9 is increased up to the fine pitch angle θfine, the wind turbine generator 1 is interconnected to the utility grid to allow the wind turbine generator 1 to go online.

Figure 4:
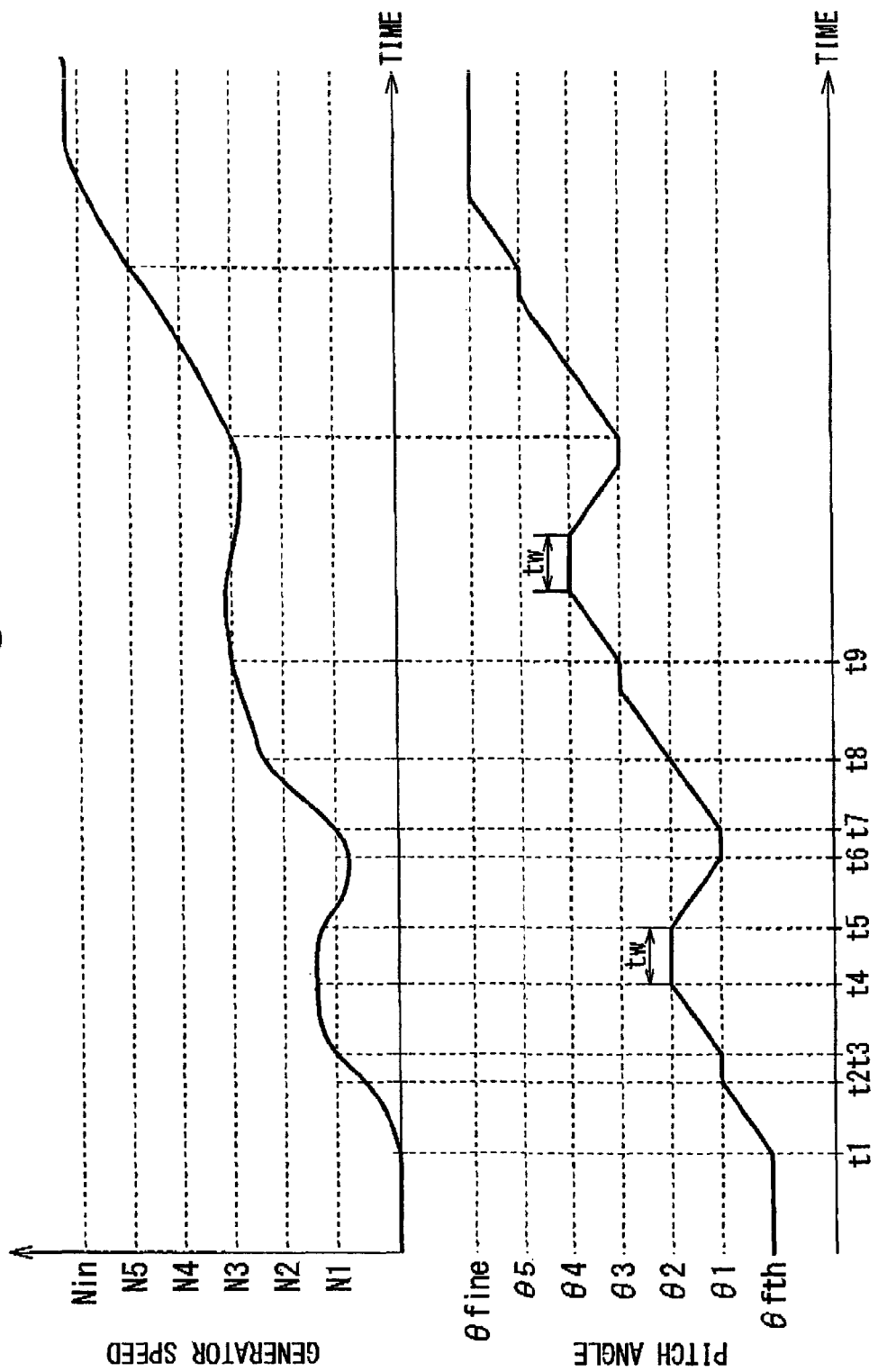
FIG. 4 is a graph showing an example of the start-up procedure of the wind turbine generator in one embodiment of the present invention.
Figure 5:
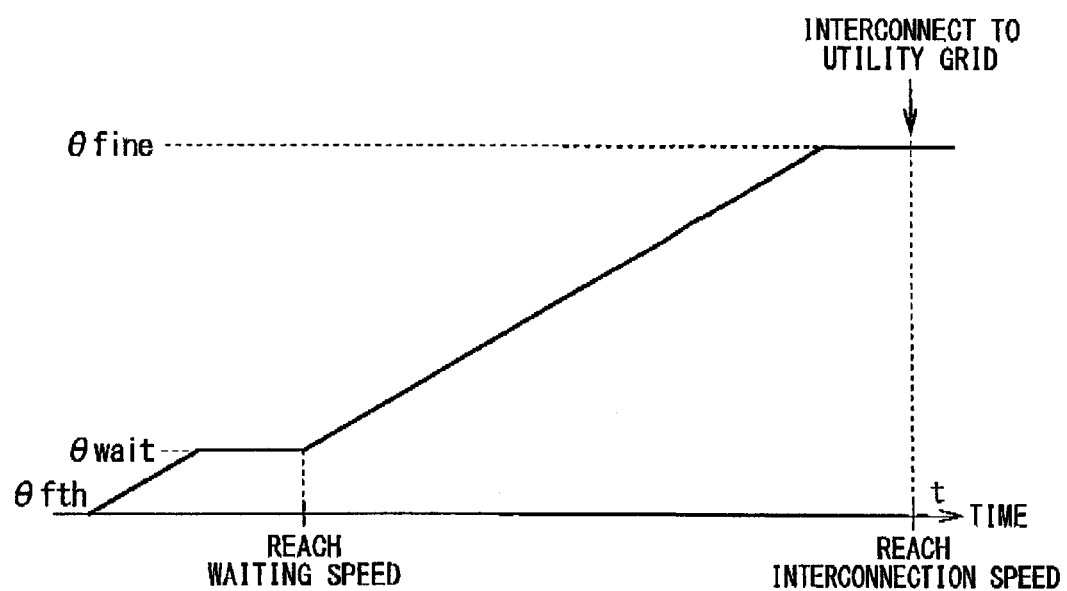
FIG. 5 is a graph showing an example of the pitch angle control in starting up the wind turbine generator.

In the following, a specific example of the start-up procedure of the wind turbine generator 1 will be described. FIG. 4 is a graph showing the start-up procedure of the wind turbine generator 1 in this embodiment. More specifically, FIG. 4 is a graph showing an example of the control of the pitch angle θ of the wind turbine blades 9.

Initially, the wind turbine rotor 7 stays still (at the time t1). When the pitch controller 13 detects that the wind speed exceeds a start-up wind speed, the pitch controller 13 releases the brakes of the wind turbine rotor 7, and starts increasing the pitch angle θ of the wind turbine blades 9 from the feather pitch angle θfth. Accordingly, the wind turbine rotor 7 starts rotating by the wind force. The pitch angle θ is increased up to the judgment pitch angle θ1. In this embodiment, the rate of the increase of the pitch angle θ is set to a predetermined constant value.

When the pitch angle θ of the wind turbine blades 9 reaches the judgment pitch angle θ1 (at the time t2), the pitch controller 13 judges whether the generator speed N exceeds the judgment generator speed N1. The pitch angle θ of the wind turbine blades 9 is kept at the judgment pitch angle θ1 while the pitch controller 13 is making this judgment. When detecting that the generator speed N exceeds the judgment generator speed N1 before the elapse of a predetermined waiting time tw, the pitch controller 13 increases the pitch angle θ of the wind turbine blades 9 from the judgment pitch angle θ1. When the generator speed N does not exceed the judgment generator speed N1 even after the predetermined waiting time tw elapses, on the other hand, the pitch controller 13 returns the pitch angle θ of the wind turbine blades 9 from the judgment pitch angle θ1 to the feather pitch angle θfth. In the example of FIG. 4, the pitch controller 13 judges that the generator speed N exceeds the judgment generator speed N1 (at the time t3), and the pitch angle θ of the wind turbine blades 9 is increased from the judgment pitch angle θ1 to the judgment pitch angle θ2.

When the pitch angle θ of the wind turbine blades 9 reaches the judgment pitch angle θ2 (at the time t4), the pitch controller 13 judges whether the generator speed N exceeds the judgment generator speed N2. While the pitch controller 13 is making this determination, the pitch angle θ of the wind turbine blades 9 is kept at the judgment pitch angle θ2. In the example of FIG. 4, the pitch controller 13 judges that the generator speed N does not exceed the judgment generator speed N2 even after the waiting time tw elapses (at the time t5), and decreases the pitch angle θ to the judgment pitch angle θ1, which is the pitch angle for the previous step (at the time t6).

When the pitch angle θ of the wind turbine blades 9 reaches the judgment pitch angle θ1 again (at the time t7), the pitch controller 13 judges whether the generator speed N exceeds the judgment generator speed N1. While the pitch controller 13 is making this determination, the pitch angle θ of the wind turbine blades 9 is kept at the judgment pitch angle θ1. In the example of FIG. 4, the pitch controller 13 judges that the generator speed N exceeds the judgment generator speed N1 (at the time t7), and increases the pitch angle θ to the judgment pitch angle θ2 again.

When the pitch angle θ of the wind turbine blades 9 reaches the judgment pitch angle θ2 again (at the time t8), the pitch controller 13 judges whether the generator speed N exceeds the judgment generator speed N2. In the example of FIG. 4, the pitch controller 13 judges that the generator speed N exceeds the judgment generator speed N2 when the pitch angle θ of the wind turbine blades 9 reaches the judgment pitch angle θ2, and increases the pitch angle θ to the judgment pitch angle θ3, which is the pitch angle for the next step (at the time t9).

Subsequently, the procedures of increasing the pitch angle θ step by step are similarly repeated until the pitch angle θ reaches the fine pitch angle θfine. When the generator speed N reaches the interconnection speed Nin in a state in which the pitch angle θ of the wind turbine blades 9 reaches the fine pitch angle θfine, the wind turbine generator 1 is interconnected to the utility grids to thereby allow the wind turbine generator 1 to go online.

In the above-described start-up procedure of the wind turbine generator 1 in this embodiment, the pitch angle θ is increased when the generator speed N follows up to the increase of the pitch angle θ, and the pitch angle θ is decreased when the generator speed N does not follow up to the increase of the pitch angle θ. Besides, the start-up procedure of the wind turbine generator 1 in this embodiment does not require a complicated control algorithm. As thus described, the start-up procedure of the wind turbine generator 1 in to this embodiment prevents the wind turbine 9 from stalling in starting up the wind turbine generator 1 with a simple control algorithm, achieving a stable start-up of the wind turbine generator 1.

In the start-up procedure of the wind turbine generator 1 in this embodiment, the pitch angle θ of the wind turbine blades 9 does not reach the fine pitch angle θfine when the generator speed N does not follow up to the increase of the pitch angle θ of the wind turbine blades 9. This respect can be conversely used in a method for detecting a failure. The instance in which the generator speed N does not follow up to the increase of the pitch angle θ of the wind turbine blades 9 is assumed to be, for example, low wind speed and deterioration of performance of the wind turbine blades 9 due to icing or the like. Therefore, deterioration of the performance of the wind turbine blades 9 (such as icing) can be simply detected with the start-up wind speed set to an appropriate value.

More specifically, the start-up of the wind turbine generator 1 is initiated when the wind speed is detected as exceeding the start-up wind speed. More specifically, the brakes of the wind turbine rotor 7 are released and the pitch angle θ of the wind turbine blades 9 starts being increased from the feather pitch angle θfth. Accordingly, the wind turbine rotor 7 starts rotating by the wind force. The pitch controller 13 increases the pitch angle θ of the wind turbine blades 9 step by step according to the above-stated procedure.

If the generator speed N does not reach the interconnection speed Nin even when the elapsed time from starting the wind turbine generator 1 reaches a predetermined time, the pitch controller 13 determines whether the performance of the wind turbine blades 9 is deteriorated, while taking into account the wind speed. If the wind speed is low (typically, if the wind speed is lower than a predetermined reference value), the pitch controller 13 determines that the rotational speed is decreased due to the reduction of the wind speed. In this case, the pitch controller 13 returns the pitch angle θ of the wind turbine blades 9 to the feather pitch angle θfth and once returns the wind turbine generator 1 into the waiting state. If the wind speed is high (typically, if the wind speed is lower than the predetermined reference value), on the other hand, the pitch controller 13 determines that deterioration of the performance of the wind turbine blades occurs due to icing or the like. When the pitch controller 13 determines that the deterioration of the performance of the wind turbine blades 9 occurs, the pitch controller 13 outputs an alarm indicating occurrence of the deterioration of the performance of the wind turbine blades 9. The alarm may be displayed on a display device, outputted as alarm sound, or outputted by other notification means (such as an alarm lamp).

The reckoning time from which the elapsed time is reckoned may be defined variously. For example, the reckoning time may be defined as the time when the wind turbine rotor 7 starts rotating by the wind force. Alternatively, the reckoning time may be defined as the time when the pitch angle θ starts increasing from the feather pitch angle θfth. As long as the elapsed time is reckoned in response to the fact that the wind speed exceeds a predetermined start-up wind speed, the reckoning time may be defined arbitrarily.

Although various embodiments of the present invention are specifically described, the present invention should not be interpreted to be limited to the above-stated embodiments. For example, the rotational speed of the wind turbine rotor 7 (the wind turbine speed) may be used for the control in place of the generator speed N; the wind turbine speed basically corresponds to the generator speed N.

The invention claimed is:

1. A start-up method of a wind turbine generator, comprising:
    a step of increasing a pitch angle of a wind turbine blade from a feather pitch angle to a fine pitch angle,
    wherein the step of increasing said pitch angle includes using a controller to:
    determine, based on first to $n^{th}$ pitch angles ($n \geq 2$) greater than said feather pitch angle and smaller than said fine pitch angle and first to $n^{th}$ rotational speed conditions associated with said first to $n^{th}$ pitch angles, respectively, whether a control target rotational speed, which is a wind turbine speed or generator speed, satisfies an $i^{th}$ rotational speed condition out of said first to $n^{th}$ rotational speed conditions when said pitch angle reaches an $i^{th}$ rotational speed out of said first to $n^{th}$ pitch angles, the first to $n^{th}$ pitch angles and the first to nth n-th rotational speed conditions being stored in a storage unit of the controller, wherein $n \geq i \geq 1$;
    decrease said pitch angle to an $(i-1)^{th}$ pitch angle or said feather pitch angle in a case that said control target rotational speed does not satisfy said $i^{th}$ rotational speed condition when said pitch angle reaches the ith i-th pitch angle; and
    increase said pitch angle to an $(i+1)^{th}$ pitch angle or said fine pitch angle in a case that said control target rotational speed satisfies said $i^{th}$ rotational speed condition when said pitch angle reaches said $i^{th}$ pitch angle.

2. The start-up method according to claim 1, further comprising a step of:
    outputting an alarm in a case that said control target speed does not reach a predetermined interconnection speed when an elapsed time which is reckoned in response to a wind speed exceeding a start-up wind speed reaches a predetermined time.

3. A wind turbine generator, comprising:
    a wind turbine rotor including a wind turbine blade having a variable pitch angle;
    a generator coupled to said wind turbine rotor; and
    a controller for controlling said pitch angle,
    wherein said controller includes a storage unit storing first to $n^{th}$ pitch angles ($n \geq 2$) greater than a feather pitch angle and smaller than a fine pitch angle, and first to $n^{th}$ rotational speed conditions associated with said first to $n^{th}$ pitch angles, respectively,
    wherein said controller controls said pitch angle of said wind turbine blade to be increased from said feather pitch angle to said fine pitch angle,
    in the control for increasing said pitch angle from said feather pitch angle to said fine pitch angle, said controller
    determines whether a control target rotational speed, which is a wind turbine speed or a generator speed, satisfies an $i^{th}$ rotational speed condition out of said first to $n^{th}$ rotational speed conditions when said pitch angle reaches an $i^{th}$ pitch angle out of the first to $n^{th}$ pitch angle,
    decreases said pitch angle to an $(i-1)^{th}$ pitch angle or said feather pitch angle if said control target rotational speed does not satisfy said $i^{th}$ rotational speed condition when said pitch angle reaches said ith i-th pitch angle, and
    increases said pitch angle to an $(i+1)^{th}$ pitch angle or said fine pitch angle if said control target rotational speed satisfies said $i^{th}$ rotational speed condition when said pitch angle reaches said $i^{th}$ pitch angle, wherein $n \geq i \geq 1$.

4. The wind turbine generator according to claim 3, wherein said controller reckons an elapsed time in response to a wind speed exceeding a start-up wind speed, and outputs an alarm in a case that said control target speed does not reach a predetermined interconnection speed when said elapsed time reaches a predetermined time.

* * * * *